(12) United States Patent
Huelsen et al.

(10) Patent No.: US 11,951,913 B2
(45) Date of Patent: Apr. 9, 2024

(54) ROOF MODULE FOR FORMING A VEHICLE ROOF COMPRISING AN ENVIRONMENT SENSOR

(71) Applicant: Webasto SE, Stockdorf (DE)

(72) Inventors: Michael Huelsen, Stockdorf (DE); Cèdric Langlais, Stockdorf (DE); Michael Mailhamer, Stockdorf (DE); Juraj Lehotsky, Stockdorf (DE); Dirk Legler, Stockdorf (DE); Michael Deppe, Stockdorf (DE); Max Huber, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 17/635,445

(22) PCT Filed: Aug. 13, 2020

(86) PCT No.: PCT/EP2020/072786
§ 371 (c)(1),
(2) Date: Feb. 15, 2022

(87) PCT Pub. No.: WO2021/032597
PCT Pub. Date: Feb. 25, 2021

(65) Prior Publication Data
US 2022/0289301 A1    Sep. 15, 2022

(30) Foreign Application Priority Data
Aug. 19, 2019 (DE) .................... 10 2019 122 206.0

(51) Int. Cl.
*B60R 11/04* (2006.01)
*B60R 11/00* (2006.01)
(Continued)

(52) U.S. Cl.
CPC .......... *B60R 11/0258* (2013.01); *B60R 11/00* (2013.01); *B60R 11/0264* (2013.01);
(Continued)

(58) Field of Classification Search
CPC ..... B62D 25/06; B60R 11/00; B60R 11/0258; B60R 11/0264; B60R 11/04; B60R 2011/0028
(Continued)

(56) References Cited

U.S. PATENT DOCUMENTS 10,099,630 B1    10/2018 Krishnan
10,144,424 B2 *  12/2018 Hara ..................... G01S 13/931
(Continued)

FOREIGN PATENT DOCUMENTS

CN    110018704 A *   7/2019 ........... G01D 11/245
DE    102008042553 A1    4/2010
(Continued)

OTHER PUBLICATIONS

International Search Report for PCT/EP2020/072786 dated Mar. 26, 2021, in English and German (9 pages).
(Continued)

*Primary Examiner* — Dennis H Pedder
(74) *Attorney, Agent, or Firm* — Fitch, Even, Tabin & Flannery, LLP

(57) ABSTRACT

A roof module for forming a vehicle roof on a motor vehicle has a panel component whose outer surface at least partially forms the roof skin of the vehicle roof, the roof module has at least one environment sensor, and the environment sensor being configured to send and/or receive electromagnetic signals for detecting the vehicle environment, and the panel component being made of a material which is impermeable to the electromagnetic signals of the environment sensor. The panel component has at least one cutout through which
(Continued)

the electromagnetic signals of the environment sensor can pass.

8 Claims, 15 Drawing Sheets

(51) Int. Cl.
    *B60R 11/02*     (2006.01)
    *B62D 25/06*     (2006.01)

(52) U.S. Cl.
    CPC .............. *B60R 11/04* (2013.01); *B62D 25/06* (2013.01); *B60R 2011/0028* (2013.01)

(58) Field of Classification Search
    USPC ......................................................... 296/210
    See application file for complete search history.

(56) References Cited

U.S. PATENT DOCUMENTS

| | | | |
|---|---|---|---|
| 10,525,901 B2 * | 1/2020 | Lewis | ..................... B60R 11/04 |
| 2016/0236725 A1 | 8/2016 | Shirai et al. | |
| 2016/0297482 A1 | 10/2016 | Sakabe et al. | |
| 2017/0305242 A1 | 10/2017 | Gallagher et al. | |
| 2017/0307738 A1 | 10/2017 | Schwarz et al. | |
| 2019/0003895 A1 | 1/2019 | Krishnan et al. | |
| 2020/0189487 A1 * | 6/2020 | Mckendrick | ........... H04N 23/57 |

FOREIGN PATENT DOCUMENTS

| | | |
|---|---|---|
| DE | 202017101968 U1 | 9/2017 |
| DE | 102018115498 A1 | 1/2019 |
| DE | 102018115502 A1 | 1/2019 |
| EP | 1473193 A1 | 11/2004 |
| EP | 2 860 820 A1 | 4/2015 |
| EP | 3 078 987 A1 | 10/2016 |
| JP | 2015107764 A | 6/2015 |
| WO | 2008121760 A1 | 10/2008 |

OTHER PUBLICATIONS

Translation of International Search Report and Written Opinion for PCT/EP2020/072786 dated Mar. 3, 2022, in English (12 pages).

* cited by examiner

ROOF MODULE FOR FORMING A VEHICLE ROOF COMPRISING AN ENVIRONMENT SENSOR

CROSS-REFERENCE TO RELATED APPLICATION

This application is a U.S. national phase application filed under 35 U.S.C. § 371 of International Application No. PCT/EP2020/072786, filed Aug. 13, 2020, designating the United States, which claims priority from German Patent Application Number 10 2019 122 206.0, filed on Aug. 19, 2019, which is hereby incorporated herein by reference in its entirety for all purposes.

FIELD

The invention relates to a roof module for forming a vehicle roof on a motor vehicle according to the preamble of claim 1.

BACKGROUND

Generic roof modules are widely used in vehicle manufacturing since these roof modules can be pre-fabricated as separate functional modules and can be delivered to the assembly line when assembling the vehicle. At its outer surface, the roof module at least partially forms the roof skin of the vehicle roof, which prevents humidity and airflows from entering the vehicle interior. To this end, the roof skin is made of an appropriately stable material, such as a painted metal plate or painted or dyed-through plastic. The roof module can be either a part of a rigid vehicle roof or a part of an openable roof sub-assembly.

Autonomously or semi-autonomously driving motor vehicles are increasingly common in vehicle manufacturing. A plurality of environment sensors detecting the surroundings of the motor vehicle and determining the current traffic situation are required in order to enable the vehicle controller to control the motor vehicle autonomously or semi-autonomously. To this end, the known environment sensors send and/or receive appropriate electromagnetic signals, such as laser beams or radar beams, appropriate signal evaluation allowing a data model of the vehicle environment to be generated and be used for controlling the vehicle. The known environment sensors are installed in appropriate sensor housings in order to protect the environment sensors from harmful environmental conditions, such as humidity and airflows. This sensor housing is mounted on top of the roof skin formed by the roof module in order to afford the environment sensor an appropriate 360° view.

Mounting a sensor housing on top of the vehicle roof is disadvantageous in that the separate sensor housing negatively affects the aerodynamic properties of the vehicle. The vehicle appearance is also negatively affected by the sensor housing mounted separately on top of the roof skin of the roof module.

SUMMARY

Hence, the object of the present invention is to propose a roof module which avoids the disadvantages of the known state of the art described above.

This object is attained by a roof module according to the teaching of claim 1.

Advantageous embodiments of the invention are the subject matter of the dependent claims.

The roof module according to the invention is based on the idea that the panel component of the roof module, whose outer surface forms the roof skin of the vehicle roof, is used as part of the sensor housing for housing the environment sensor. So as a result, the environment sensor will be located below the roof skin instead of above according to the invention.

The function of the environment sensor requires the electromagnetic signals of the environment sensor to be emitted and/or received by the environment sensor undisturbed. Since the common materials for producing the panel component forming the roof skin are insufficiently permeable or impermeable to the electromagnetic signals of the known environment sensors, as is the case if the panel component is made of a metal plate or of plastic not appropriately specified, for example, the panel component according to the invention has a cutout through which the electromagnetic signals of the environment sensor can pass. Impermeability to the electromagnetic signals within the meaning of the invention means that the material of the panel component exhibits excessive passage resistance and/or excessive and/or insufficient signal damping. Hence, the panel component has one or multiple cutouts where the electrical signals emitted and/or received by the environment sensor can pass unhindered.

In the simplest form of the invention, the cutout in the panel component forms an opening in the vehicle roof through which the electromagnetic signals of the environment sensor can pass. However, this form presents the disadvantage that undesired environmental conditions, such as airflows or humidity, can enter through the unprotected opening in the panel component. To avoid these undesired environmental conditions, which might affect the function of the environment sensor, it is therefore particularly advantageous for a cover element to be disposed in the cutout of the panel component, the cover element being made of a material through which the electromagnetic signals of the environment sensor can pass undisturbed. Undisturbed passage within the meaning of the invention means that the material of the cover element exhibits sufficiently low passage resistance and/or low signal damping and/or high transmission.

Since the environment sensor is disposed below the panel component forming the roof skin, the flow properties of the roof module can be improved with regard to aerodynamics and a more pleasant design can be achieved when designing autonomously or semi-autonomously operated vehicles. However, the arrangement of the environment sensor below the roof skin of the roof module leads to additional temperature-related issues. If the panel component forming the roof skin heats up, this might lead to temperature-related length expansions of the panel component. These temperature-related length expansions might affect the functionality of the environment sensor. For example, the geometry of the beam path of the electromagnetic signals of the environment sensor might change because of these length expansions if a cover element is provided in the cutout of the panel component. These changes in the beam path will lead to distorted evaluation results and might cause misinterpretations when evaluating the sensor signals of the environment sensor. The panel component can be composed of multiple segments in order to reduce or entirely eliminate such undesired length expansions with a view to the functionality of the environment sensor. Additional expansion profiles, such as elastomer profiles, can be provided between the individual segments. If the individual segments of the panel component expand because of solar irradiation, these temperature-related length expansions can be absorbed and compensated for by the expansion joint elements. Excessive deformations on the panel component as a whole, in particular with regard to the arrangement of a cover element in the cutout of the panel component, can be significantly reduced in this manner.

With regard to the issue of the temperature-related length expansions, it is alternatively or additionally possible for the roof module to comprise a temperature sensor which can be used to measure the temperature of at least one component of the roof module and/or the temperature of the interior in the roof module. By suitably evaluating the measured data of the temperature sensor, a compensation of the interference caused by the temperature-dependent length expansions can be calculated and taken into account in the evaluation of the sensor signals of the environment sensor.

The temperature can be detected by means of the temperature sensor at any point of the roof module. The temperature in the area of the cover element disposed in the cutout of the panel component is particularly significant with regard to the function of the environment sensor. After all, temperature-related length expansions of the cutout lead to undesired changes in the geometry of the beam path of the electromagnetic signals of the environment sensor through the cover element and therefore to corresponding interference when evaluating the sensor data of the environment sensor.

The temperatures measured using the temperature sensor can be used in basically any manner to compensate for the interference caused by them in the operation of the environment sensor. According to a preferred variation of the device, the temperature measured by the temperature sensor is transmitted to the controller of the environment sensor. Subsequently, the controller of the environment sensor can be recalibrated as a function of the temperature measured by the temperature sensor and can be adjusted to the changed geometry of the input due to the change in temperature.

The controller of the environment sensor can be calibrated in basically any manner. According to a preferred variation of the device, at least one temperature curve for describing the temperature-dependent expansion of a component is stored in the controller of the environment sensor. In this case, the temperature-dependent changes in geometry caused by the temperatures can be deduced from the temperatures measured by the temperature sensor and the controller can be recalibrated accordingly.

If the environment sensor is mechanically connected to the panel component, heating up of the panel component can cause undesired changes in the position of the environment sensor relative to the vehicle body. These changes in position depending on the temperature of the panel component in turn lead to undesired calibration issues since the calibration of the environment sensor requires a fixed and unchanging position of the environment sensor on the vehicle body. Hence, it is particularly advantageous for the environment sensor to be fixed in the roof module in a manner mechanically decoupled from the panel component in order to avoid these calibration issues. In this manner, a mechanical transfer of changes in the length of the panel component to the environment sensor is avoided.

If the roof module comprises a rigid roof frame, it is particularly advantageous for the environment sensor to be attached to this roof frame in order to ensure a temperature-independent positioning of the environment sensor relative to the vehicle body.

If the cover element in the cutout of the panel component is formed as a component separate from the environment sensor, ambient light and dirt might cause the environment sensor to malfunction if ambient light or dirt enters the space between the environment sensor and the cover element. It is particularly advantageous for a protective membrane enclosing a sealed volume to be installed between the environment sensor and the cover element in order to avoid these issues caused by ambient light or dirt. In this case, no ambient light and no dirt can enter this transmission volume enclosed by the protective membrane and thereby disturb the function of the environment sensor.

If the environment sensor is connected to the cover element by means of a protective membrane, this protective membrane can also be used to fix the cover element in the cutout of the panel component. To this end, the protective membrane has to have a corresponding dimensional stability in order to hold the cover element in the cutout of the panel component. This manner of fixing the cover element in the cutout of the panel component is of particular advantage if a compensation gap is provided between the cover element and the panel component.

With regard to the undesired transfer of temperature-related deformations to the cover element in the cutout of the panel component, it is further advantageous for a compensation gap to be provided between the outer edge of the cover element and the inner edge of the cutout in the panel component. In this manner, undesired changes in position can be compensated for by the compensation gap between the cover element and the panel component.

The compensation gap between the cover element and the panel component can be sealed by a sealing element in order to avoid the entry of humidity and dirt into the installation space below the panel component forming the roof skin.

The sealing element between the cover element and the panel component can have basically any geometry. Sealing elements which are formed in the manner of a weather-strip having an H-shaped cross section are particularly advantageous. The H-shaped cross section of the weatherstrip enables the weatherstrip to compensate for changes in the length of the cover element or of the panel component without losing the seal.

Furthermore, it is particularly advantageous for the cover element to be integrated in the environment sensor in order to avoid undesired temperature effects on the radiation geometry of the electromagnetic signals during their passage through the cover element. In this manner, all geometrical changes due to changes in temperature affect the cover element and the environment sensor in equal measure with the result that there are no temperature-related relative movements between the cover element and the environment sensor.

If the cover element is integrated in the environment sensor, the side of the environment sensor carrying the cover element can be disposed in the cutout or behind the cutout in the panel component so as to at least partially or fully close the cutout in the panel component in this manner.

It is particularly advantageous for a sealing element to be provided between the cover element integrated in the environment sensor and the cutout in the panel component in order to avoid the entry of humidity and dirt into the area below the panel component forming the roof skin.

The sealing element between the cover element integrated in the environment sensor and the edge of the cutout in the panel component is preferably fixed either to the cover element only or to the panel component only. The opposite sealing surface of the sealing element can slide on the surface of the inner edge on the cutout of the panel component or on the surface of the cover element. To this end, said side of the sealing element can be formed in the manner of a sealing lip. The sliding movement in the sealing element on the one hand and in the cover element or the panel component on the other hand can realize corresponding slippage in the area of the weatherstrip in the event of temperature-related changes in length.

As an alternative, the sealing element between the cover element integrated in the environment sensor and the cutout of the panel component can also have an elastically deformable compensation section. In this case, the elastic deformation of the sealing element can compensate for a temperature-related change in length between the cover element and the panel component without endangering impermeability.

The cover element can be fixed in the cutout of the panel component in basically any manner. According to a preferred variation, clip elements which can be clipped to the inner edge of the cutout of the panel component in a fixing manner are provided in the cover element for this purpose. Another element may be additionally installed between the cover element and the panel component.

As an alternative to clipping, the cover element can also be molded onto the inner edge of the cutout by multi-component injection molding in order to be affixed to the panel component.

According to another variation, the cover element is glued to the inner edge of the cutout so as to be affixed to the panel component.

The cover element in the cutout of the panel component can be made of basically any material as long as a sufficient permeability of the material for the passage of the electromagnetic signals of the environment sensor is ensured. It is particularly advantageous for the cover element to be made of polycarbonate (PC) or polymetamethylacrylate (PMMA) or mineral glass.

Basically any type of environment sensor can be installed in the roof module according to the invention as far as the function of the environment sensor requires electromagnetic signals to be sent and/or received. The roof module according to the invention is particularly advantageous in connection with environment sensors which are configured in the manner of a lidar sensor and/or in the manner of a radar sensor and/or in the manner of a camera sensor and/or in the manner of a multi-camera sensor.

The roof module according to the invention can basically be used both in passenger vehicles and in utility vehicles, such as delivery vans or tractor trucks for heavy goods vehicles. It can be configured as a purely solid roof or can be provided with a roof opening system and thus form a closable roof opening.

Furthermore, the roof module according to the invention preferably forms a structural unit which comprises integrated means for autonomous driving or for semi-autonomous driving assisted by vehicle assistance systems and which can be placed on top of a vehicle body shell by a vehicle manufacturer.

The invention also relates to a motor vehicle having a roof module of the kind described above.

BRIEF DESCRIPTIONS OF THE DRAWINGS

Different embodiments of the invention are schematically illustrated in the drawings and will be explained as examples in the following description.

DETAILED DESCRIPTION

Figure 1:
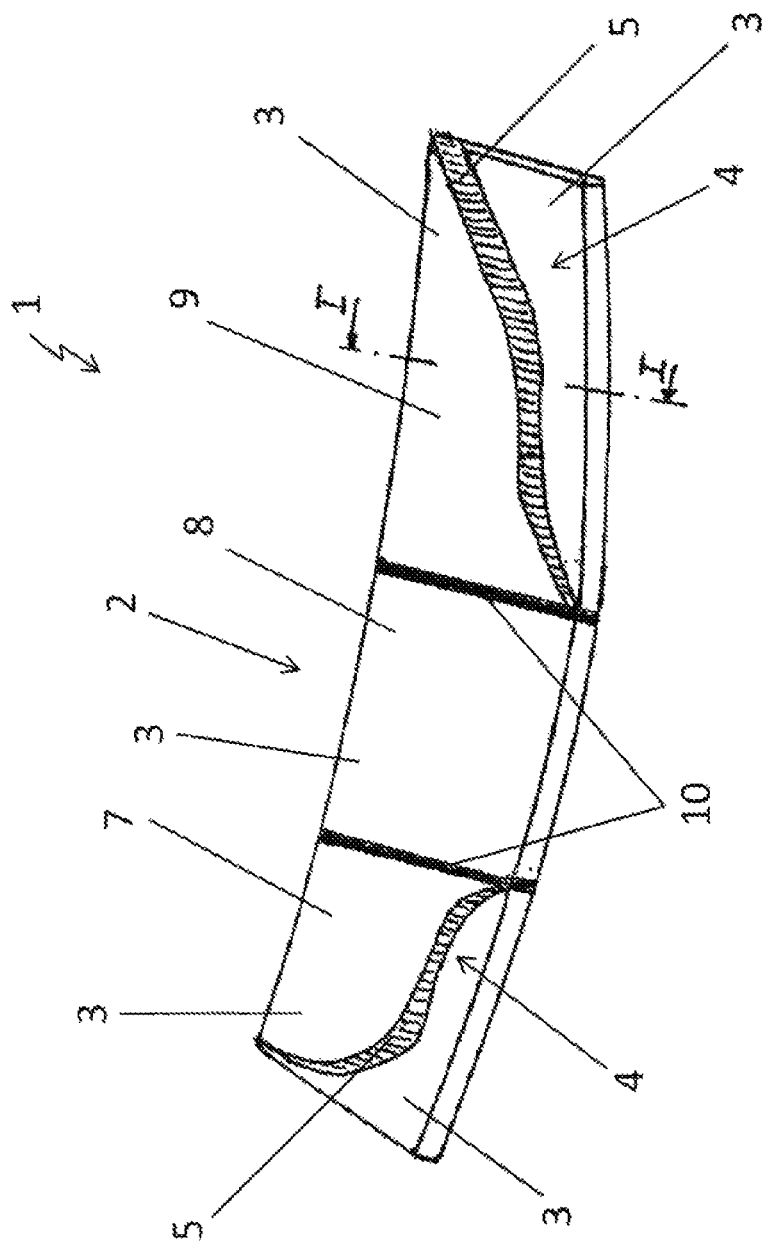
FIG. 1 is a perspective top view of a roof module comprising a panel component.

FIG. 1 shows a roof module 01 for forming a vehicle roof on a motor vehicle. Roof module 01 comprises a panel component 02, whose outer surface forms roof skin 03 in a partial area of the vehicle roof. Panel component 02 has two slot-like cutouts 04 on the right and on the left. A cover element 05 is disposed in both cutouts 04. Unlike panel component 02, the two cover elements 05 are made of a material which is permeable to the electromagnetic signals of an environment sensor 06 (see FIG. 2).

Panel component 02 is composed of three segments 07, 08 and 09 in order to compensate for temperature-related length expansions. Respective expansion joint elements 10 are disposed between segments 07 and 08 and between segments 08 and 09, each expansion joint element 10 being made of an elastically deformable joint material, for example. The transitions between the edge of cutout 04 and cover element 05 fixed therein can also each be formed by an expansion joint element so as to be able to absorb temperature-related changes in length.

Figure 2:
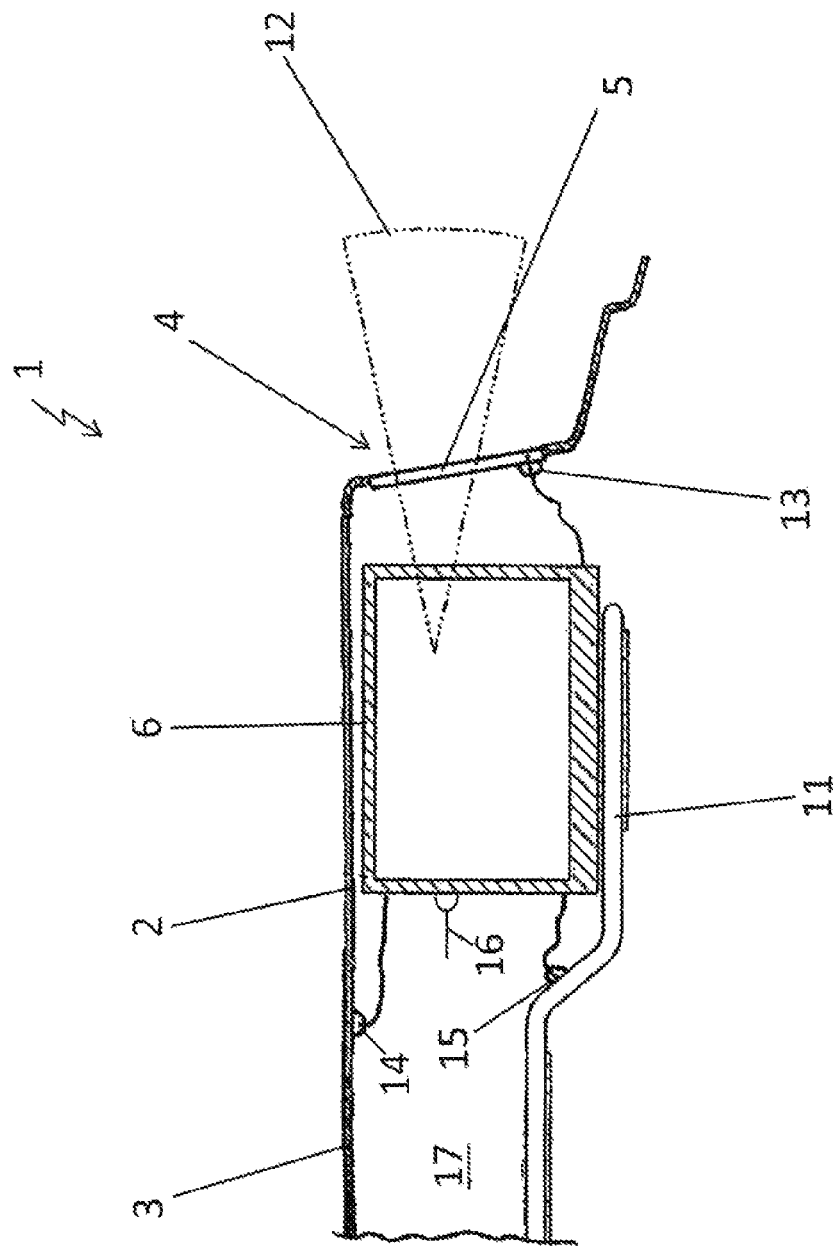
FIG. 2 is a schematic cross section of the roof module of FIG. 1 along cutting line I-I.

FIG. 2 shows a schematic cross section of roof module 01, only the parts of roof module 01 which are required for understanding the invention being illustrated. Panel component 02 forms roof skin 03 of a vehicle and forms the upper end of the vehicle body. Cutout 04, in which cover element 05 is fixed, is provided in panel component 02 on the side of roof module 01 facing toward the vehicle front.

An environment sensor 06 is installed in roof module 01 below panel component 02 and is thus covered by roof skin 03. Environment sensor 06 is completely decoupled mechanically from panel component 02. Instead, environment sensor 06 is fixed on top of a stiff roof frame 11. Electromagnetic signals 12 emitted by environment sensor 06 can easily penetrate cover element 05 in cutout 04. Environment sensor 06 is connected to four temperature sensors 13, 14, 15 and 16. Temperature sensor 13 can measure the temperature in the area of cover element 05. Temperature sensor 14 can measure the temperature of panel component 02 below roof skin 03. Temperature sensor 15 can measure the temperature of roof frame 11. Temperature sensor 16 can measure the temperature in interior 17 of roof module 01. Different temperature curves associated with temperature sensors 13, 14, 15 and 16 are stored in the controller of environment sensor 06, the temperature curves describing the correlation of the changes in the length of cover element 05, panel component 02, roof frame 11 and other components of roof module 01, if applicable. Using these temperature curves, the deformation of the components of roof module 01 can be estimated as a function of the measured temperatures and the calibration of environment sensor 06 can be changed accordingly.

Figure 3:
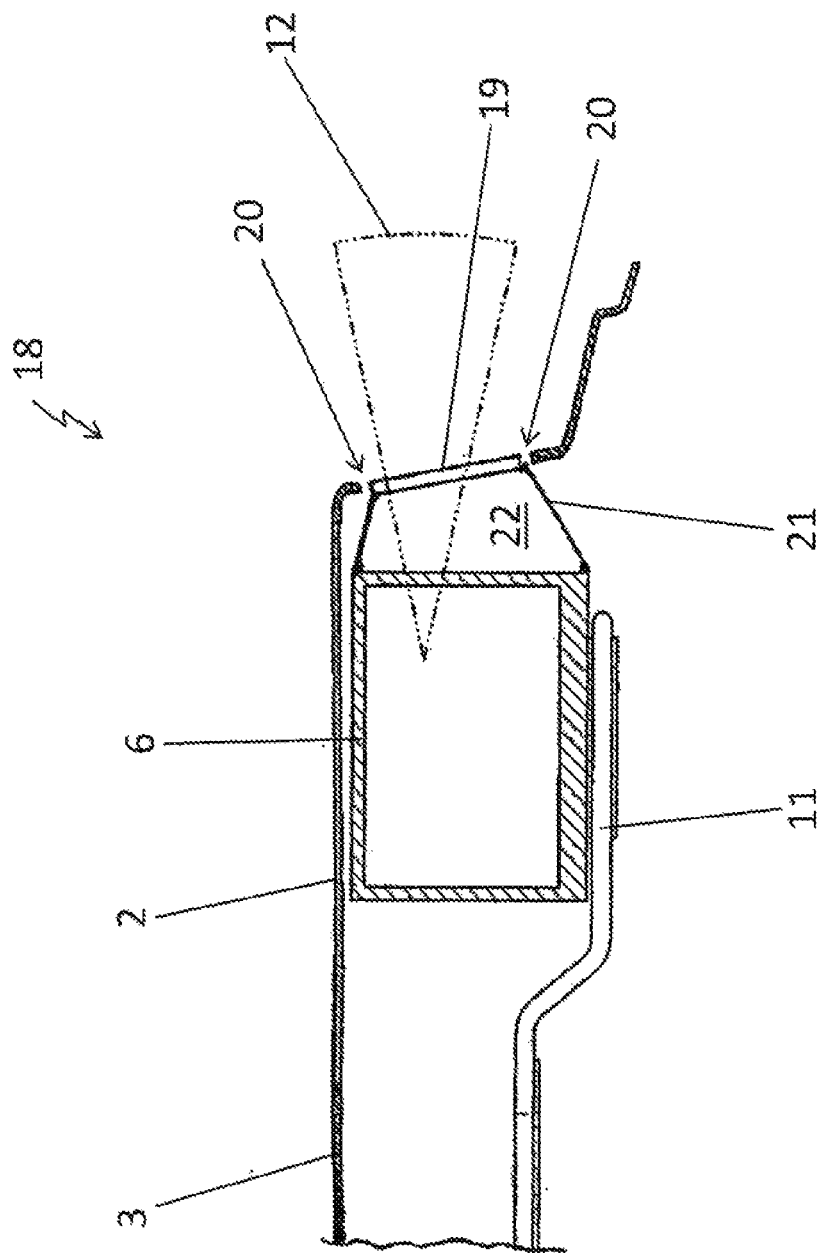
FIG. 3 is a schematic cross section of a second embodiment of a roof module.

FIG. 3 shows a roof module 18 as another embodiment, which largely corresponds to roof module 01 in terms of construction. A cover element 19 is provided on roof module 18 instead of cover element 05. Cover element 19 has a compensation gap 20 toward panel component 02 and is thus mechanically decoupled from panel component 02 with the result that temperature-related changes in the length of panel component 02 are not transferred to cover clement 19. A protective membrane 21, which is installed between environment sensor 06 and cover element 19, serves to mechanically fix cover element 19 in roof module 18. At the same time, protective membrane 21 encloses a sealed transmission volume 22, which neither ambient light nor dirt can enter.

Figure 4:
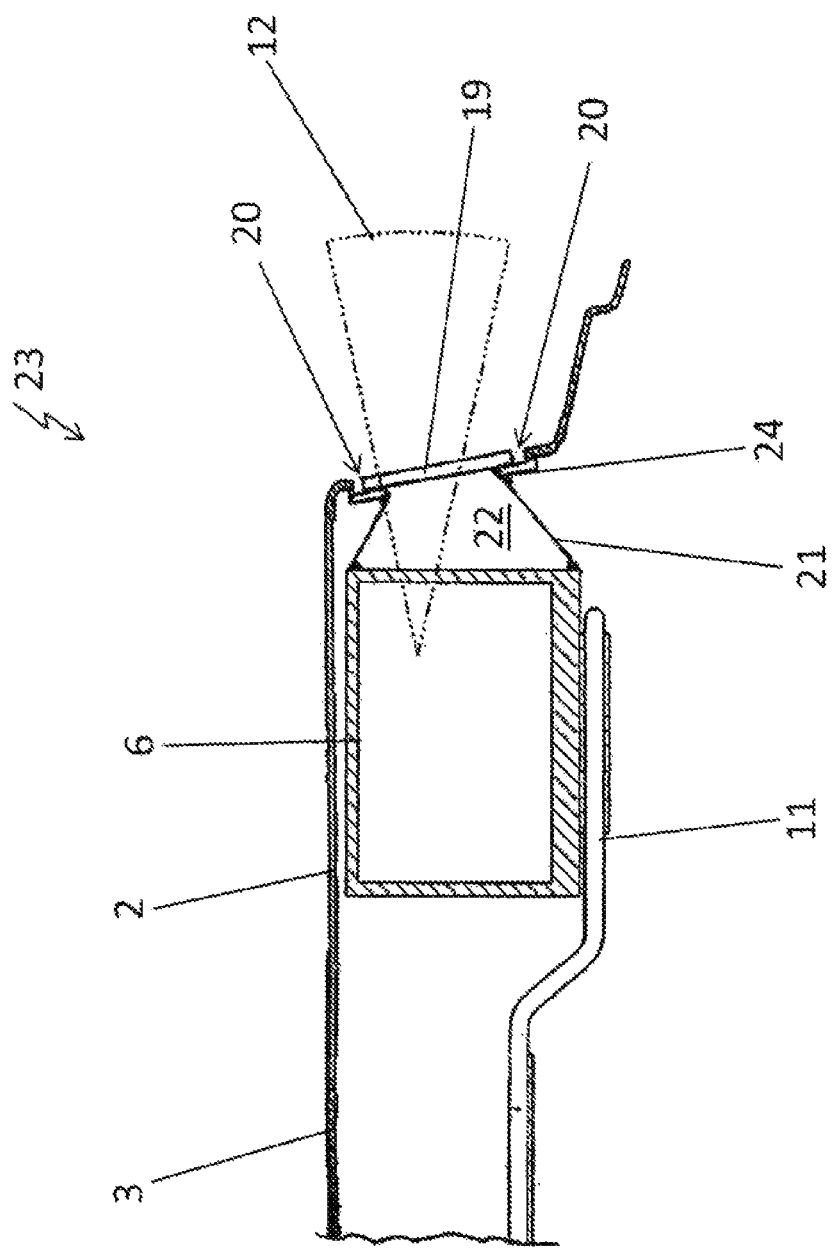
FIG. 4 is a schematic cross section of a third embodiment of a roof module.

FIG. 4 shows a roof module 23 as a third embodiment, whose construction largely corresponds to the construction of roof module 18. Compensation gap 20 of roof module 23 is additionally sealed by a sealing element 24.

Figure 5:
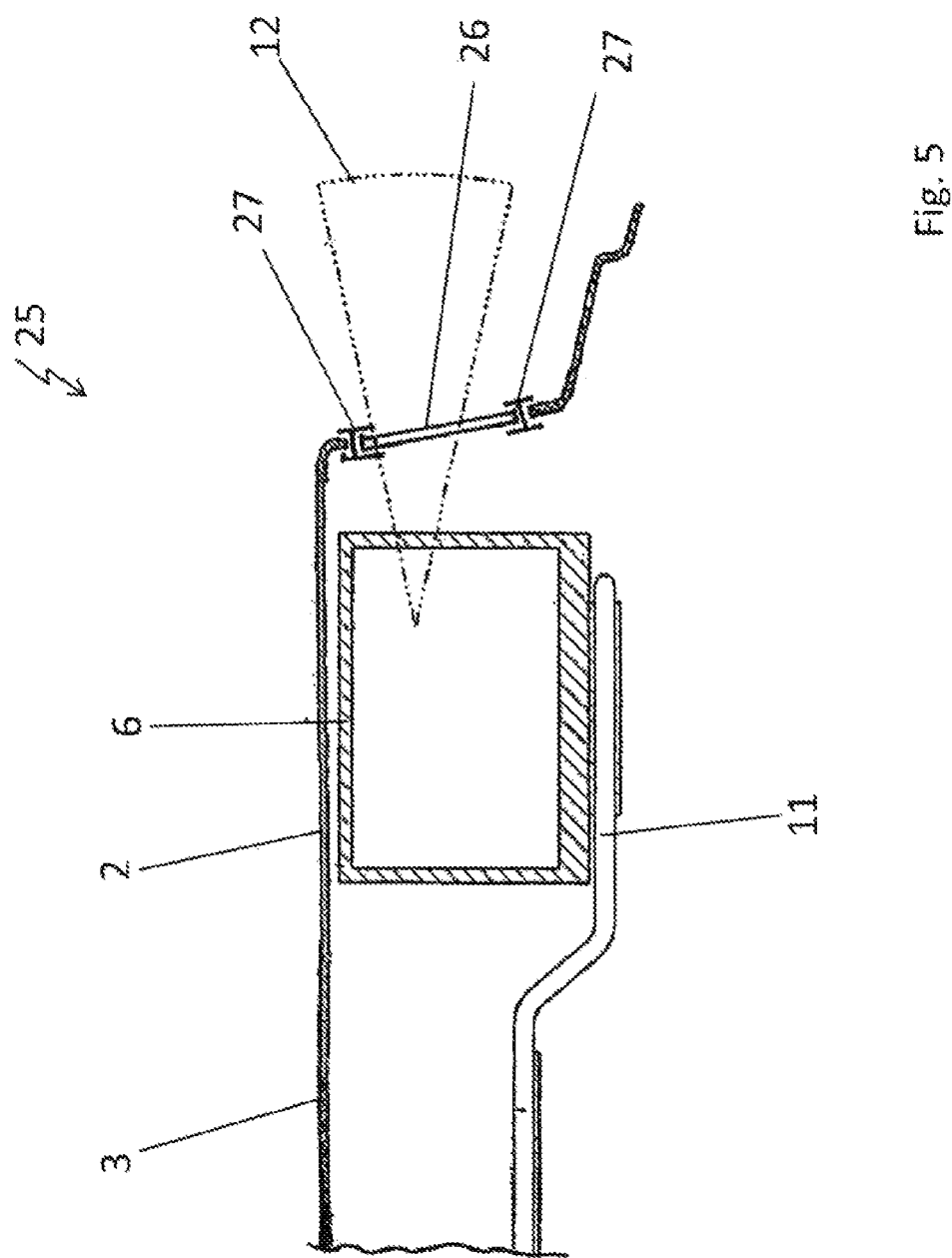
FIG. 5 is a schematic cross section of a fourth embodiment of a roof module.

FIG. 5 shows a roof module 25 as a fourth embodiment. A cover element 26 is provided in the cutout of panel component 02 of roof module 25, cover element 26 being fixed by a sealing element 27, which has an H-shaped cross section. The H-shaped cross section of sealing element 27 ensures a compensation gap between cover element 26 and panel component 02 so as to compensate for temperature-related changes in the length of panel component 02. Optionally, a protective membrane 21 or a similar connection can be additionally provided between sealing element 27 and the environment sensor.

Figure 6:
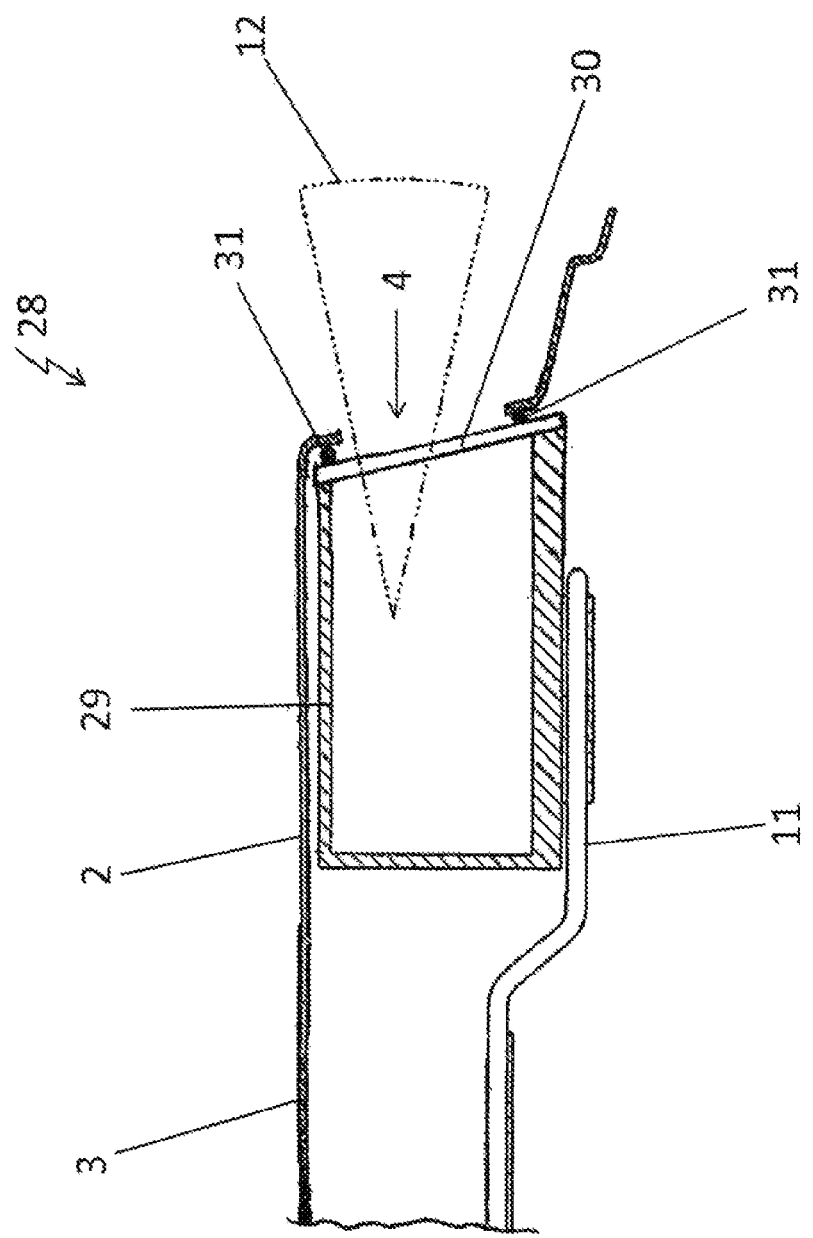
FIG. 6 is a schematic cross section of a fifth embodiment of a roof module.

FIG. 6 shows a roof module 28 as a fifth embodiment. Roof module 28 uses an environment sensor 29, on whose side facing toward the vehicle front a cover element 30 is integrated in the housing of the environment sensor. Cover element 30 is disposed behind cutout 04 in panel component 02 and is sealed by a sealing element 31.

Figure 7:
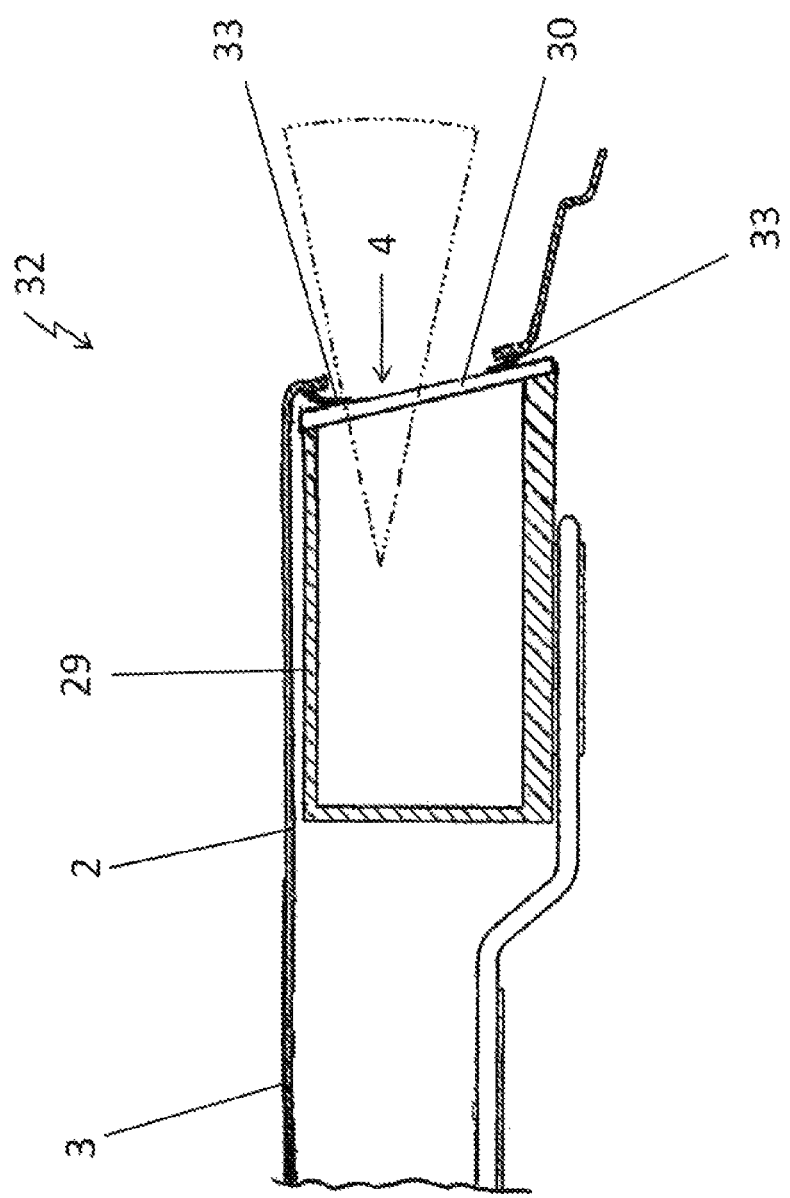
FIG. 7 is a schematic cross section of a sixth embodiment of a roof module.

FIG. 7 shows a roof module 32 as a sixth embodiment, whose construction largely corresponds to roof module 28. A sealing element 33 is used for sealing cover element 30 toward panel component 02 instead of sealing element 31. One side of sealing element 33 is attached to the front side of cover element 30 and the largely free end of sealing element 33, which is formed in the manner of a sealing lip, can slide on the surface of the inner edge on cutout 04. This allows easy compensation for relative movements between environment sensor 29 and panel component 02.

Figure 8:
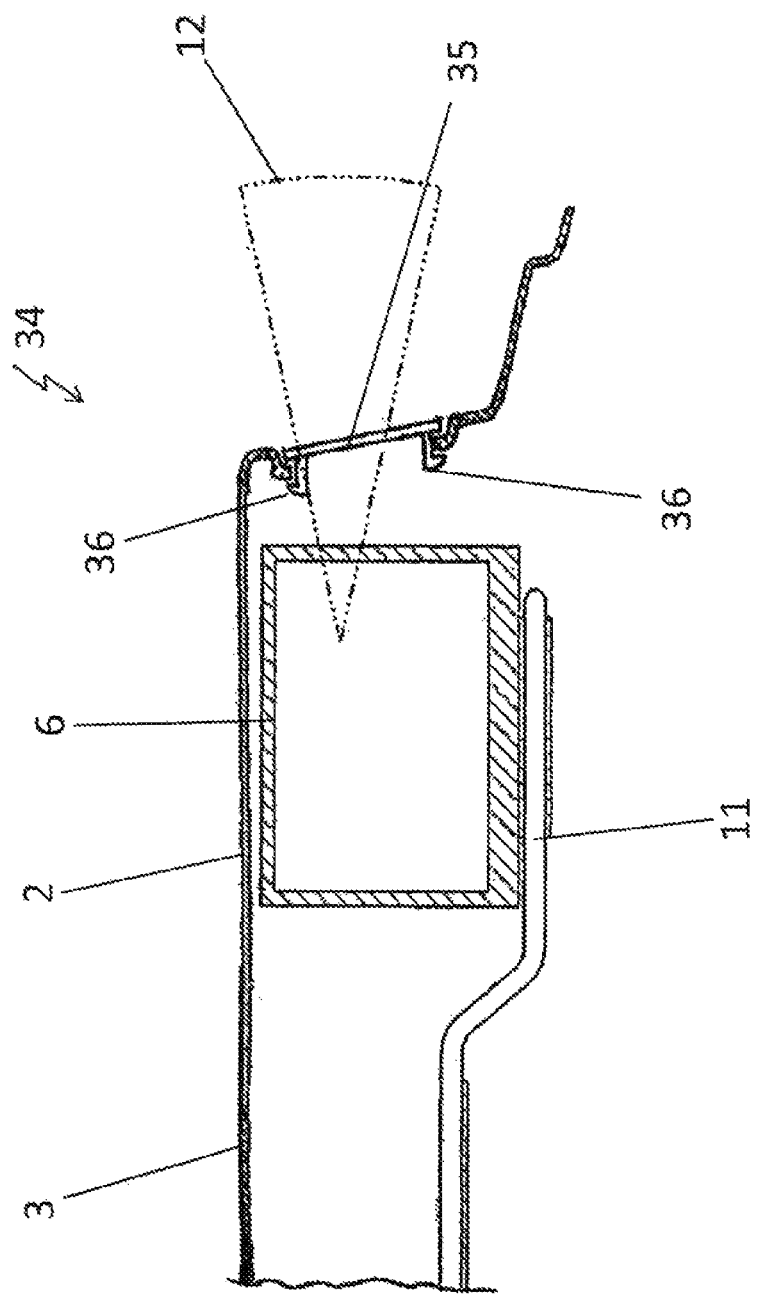
FIG. 8 is a schematic cross section of a seventh embodiment of a roof module.

FIG. 8 shows a roof module 34 as a seventh embodiment. A cover element 35 is clipped into cutout 04 of panel component 02 of roof module 34. To this end, hook-shaped clip elements 36 can be latched onto the edge of cutout 04. A weatherstrip, which is not illustrated in FIG. 8, can be additionally inserted between cover element 35 and the edge of panel component 02 for sealing purposes.

Figure 9:
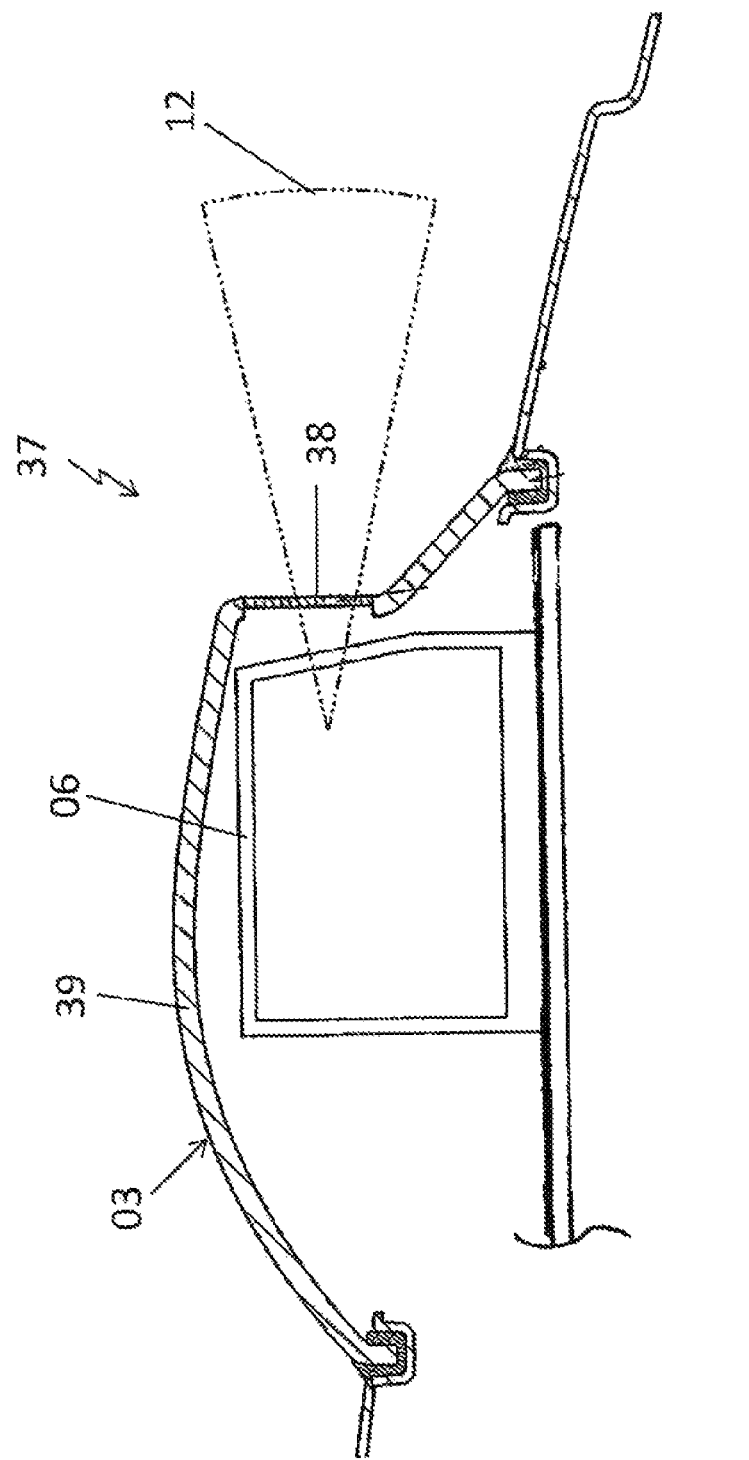
FIG. 9 is a schematic cross section of an eighth embodiment of a roof module.

FIG. 9 shows a roof module 37 as an eighth embodiment. A cover element 38 is molded onto the inner edge of the cutout of a panel component 39 of roof module 37 by multi-component injection molding. The outer edge of panel component 39 engages into a groove on the surrounding vehicle body, a sealing element being provided between panel component 39 and the vehicle body.

Figure 10:
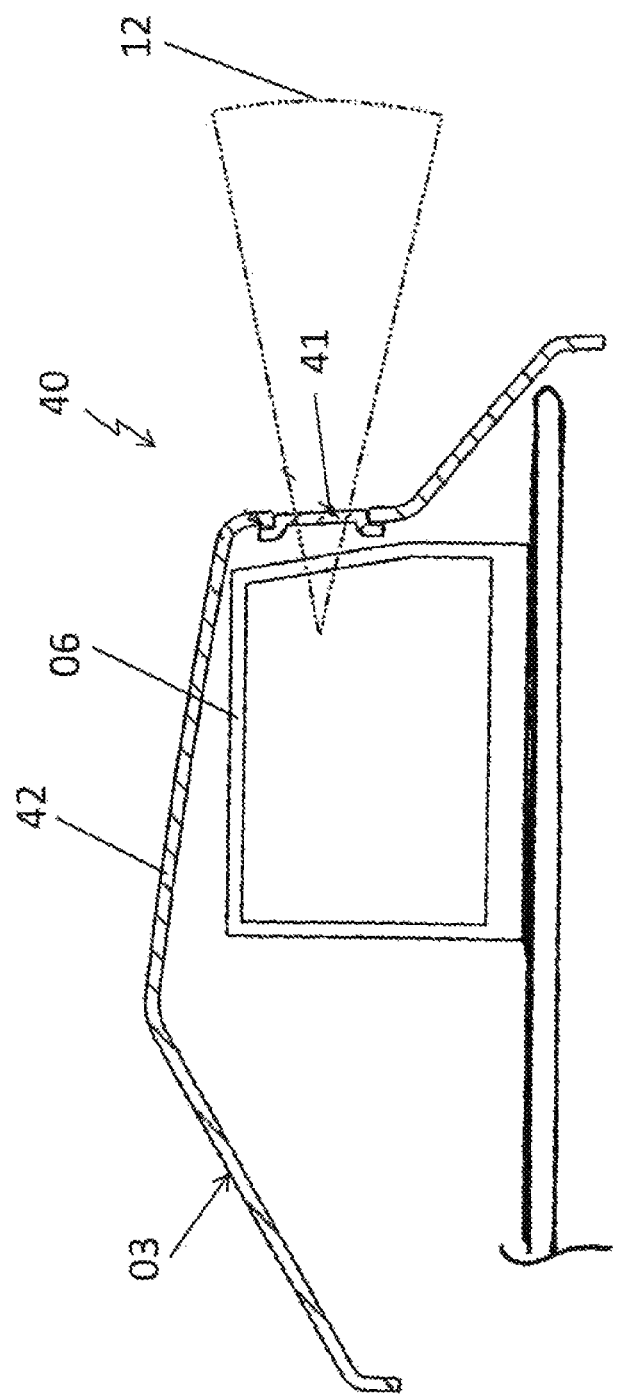
FIG. 10 is a schematic cross section of a ninth embodiment of a roof module.

FIG. 10 shows a roof module 40 as a ninth embodiment. A cover element 41 is clipped into the cutout of a panel component 42 of roof module 40. The outer edge of cover element 41 engages behind the inner edge of panel component 42 for this purpose.

Figure 11:
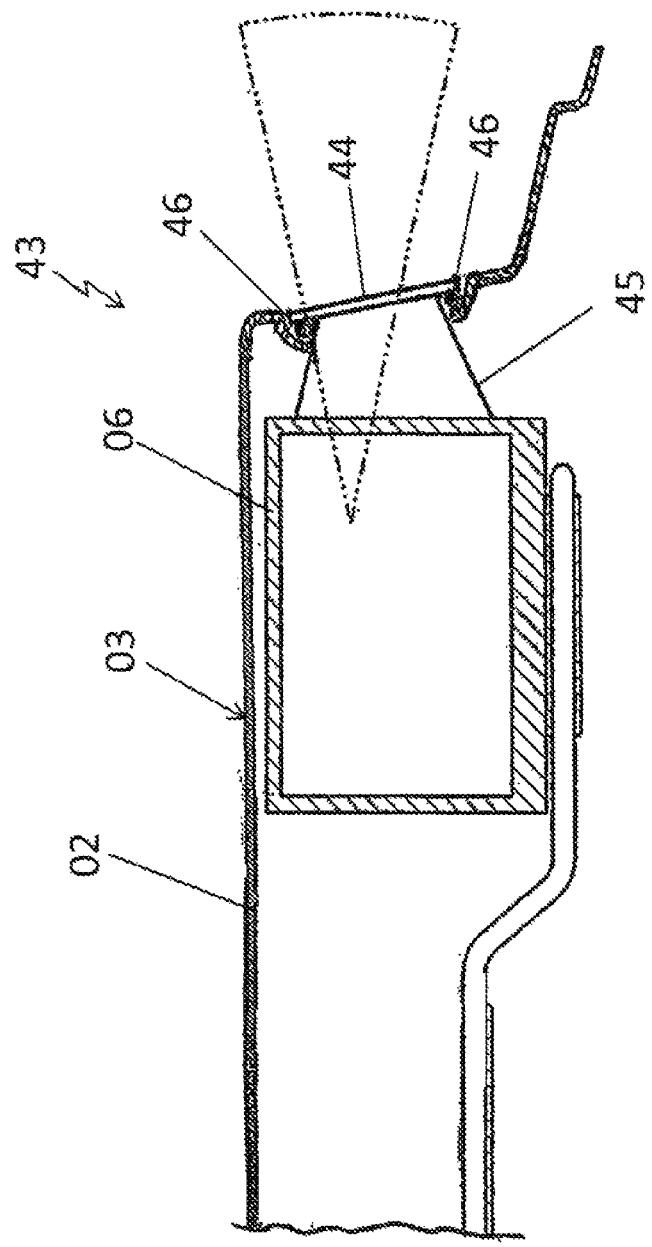
FIG. 11 is a schematic cross section of a tenth embodiment of a roof module.

FIG. 11 shows a roof module 43 as a tenth embodiment. A cover element 44 is fixed in cutout 04 of panel component 02 of roof module 43 by means of a connection 45. The gap between panel component 02 and cover element 44 is sealed by a sealing element 46.

Another aspect of the invention relates to a roof module for forming a vehicle roof on a motor vehicle according to the preamble of claim 26.

Generic roof modules are widely used in vehicle manufacturing since these roof modules can be pre-fabricated as separate functional modules and can be delivered to the assembly line when assembling the vehicle. At its outer surface, the roof module at least partially forms the roof skin of the vehicle roof, which prevents humidity and airflows from entering the vehicle interior. To this end, the roof skin is made of an appropriately stable material, such as a painted metal plate or painted or dyed-through plastic.

Autonomously or semi-autonomously driving motor vehicles are increasingly common in vehicle manufacturing. A plurality of environment sensors detecting the surroundings of the motor vehicle and determining the current traffic situation are required in order to enable the vehicle controller to control the motor vehicle autonomously or semi-autonomously. To this end, the known environment sensors send and/or receive appropriate electromagnetic signals, such as laser beams or radar beams, appropriate signal evaluation allowing a data model of the vehicle environment to be generated and be used for controlling the vehicle. The known environment sensors are installed in appropriate sensor housings in order to protect the environment sensors from harmful environmental conditions, such as humidity and airflows. This sensor housing is mounted on top of the roof skin formed by the roof module in order to afford the environment sensor an appropriate 360° view.

Mounting a sensor housing on top of the vehicle roof is disadvantageous in that the separate sensor housing negatively affects the aerodynamic properties of the vehicle. The vehicle appearance is also negatively affected by the sensor housing mounted separately on top of the roof skin of the roof module.

Hence, the object of the present invention is to propose a roof module which avoids the disadvantages of the known state of the art described above.

This object is attained by a roof module according to the teaching of claim 1.

Advantageous embodiments of the invention are the subject matter of the dependent claims.

The roof module according to the invention comprises a sensor mount on the inner side of the panel component. The environment sensor can be fixed below the roof skin in this sensor mount. Arranging the environment sensor below the roof skin allows for improved aerodynamics and an improved vehicle appearance. Moreover, undesired relative movement between the environment sensor and the panel component can be avoided by fixing the sensor mount on the inner side of the panel component.

Avoiding relative movement is important in particular if the panel component has a recess through which the environment sensor emits and/or receives its electromagnetic signals. After all, relative movement between this cutout and the environment sensor can cause interference which necessitates a recalibration of the environment sensor.

The sensor mount can be fixed to the inner side of the panel component in basically any manner. On principle, however, it is preferable for the panel component to not have any recesses for fixing the sensor mount since the roof skin of the vehicle would otherwise be interrupted by these recesses. Hence, the sensor mount is glued or welded to the inner side of the panel component according to a preferred embodiment.

Furthermore, the environment sensor can be fixed in the sensor mount in basically any manner. It is advantageous if the environment sensor can be latched in the sensor mount by means of at least one latching element in order to be able to realize a simple and reliable fixation by cost-efficient means. In particular, the form-fitting latching allows the sensor mount to be quickly and easily removed from the sensor mount in the event of malfunctions of the environment sensor and to be replaced with a replacement environment sensor.

According to a preferred variation, the sensor mount has an essentially U-shaped cross section in that it surrounds the environment sensor on three sides in order to realize a fixation of the environment sensor in the sensor mount with as little play as possible.

If the sensor mount has an essentially U-shaped cross section, it is advantageous for the latching element for fixing the environment sensor in the sensor mount to be disposed on a free leg of the U-shaped sensor mount. As a result, the latching element can easily latch or unlatch by elastic deformation of the free leg.

Basically any type of environment sensor can be installed in the roof module according to the invention as far as the function of the environment sensor requires electromagnetic signals to be sent and/or received. The roof module according to the invention is particularly advantageous in connection with environment sensors which are configured in the manner of a lidar sensor and/or in the manner of a radar sensor and/or in the manner of a camera sensor and/or in the manner of a multi-camera sensor.

Different embodiments of the invention are schematically illustrated in the drawings and will be explained as examples in the following description.

Figure 12:
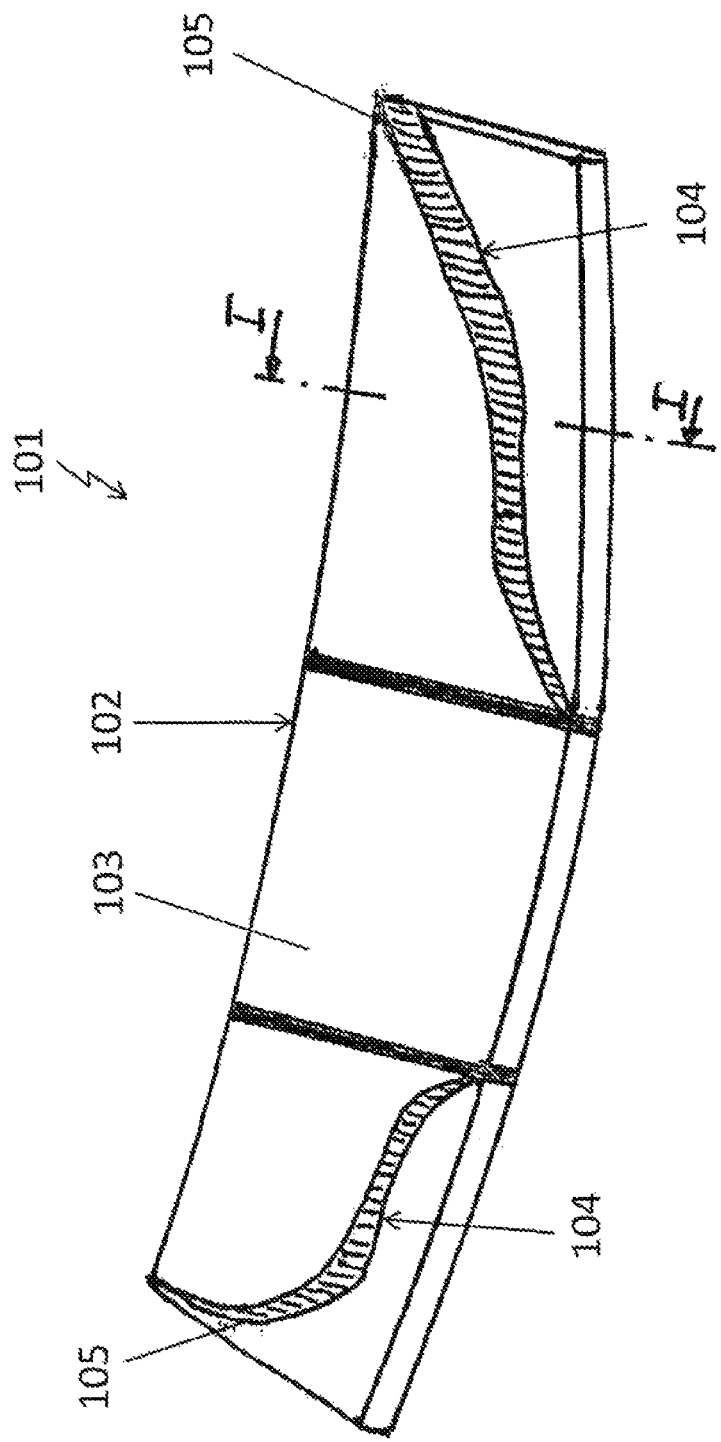
FIG. 12 is a perspective top view of a roof module comprising a panel component.

FIG. 12 shows a roof module 101 for forming a vehicle roof on a motor vehicle. Roof module 101 comprises a panel component 102, whose outer surface forms roof skin 103 in a partial area of the vehicle roof. Panel component 102 has two slot-like cutouts 104 on the right and on the left. A cover element 105 is disposed in both cutouts 104. Unlike the panel component, the two cover elements 105 are made of a material which is permeable to the electromagnetic signals of an environment sensor 106 (see FIG. 13).

Figure 13:
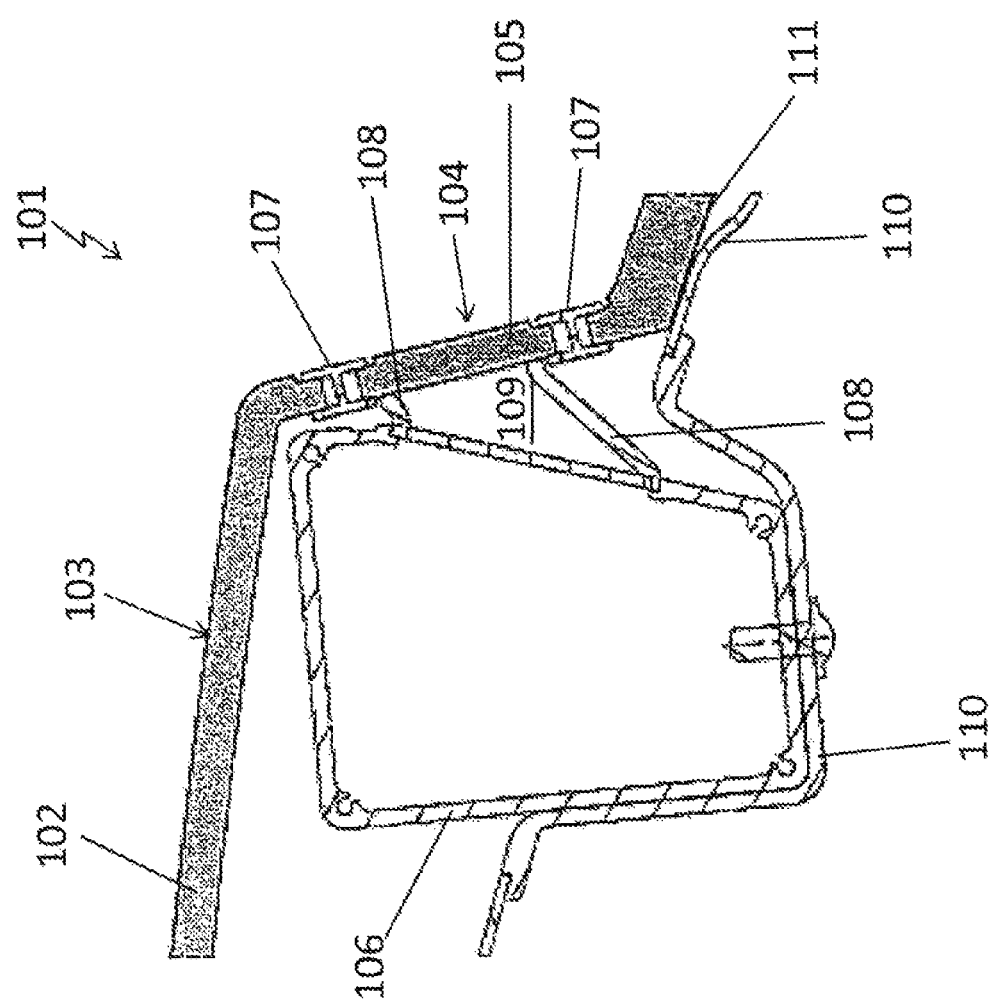
FIG. 13 is a schematic cross section of the roof module of FIG. 12 along cutting line I-I.

FIG. 13 shows a schematic cross section of roof module 1, only the parts of the roof module which are required for understanding the invention being illustrated. Panel component 102 forms roof skin 103 of a vehicle and thus forms the upper end of the vehicle body. Cutout 104, in which cover element 105 is fixed, is provided in panel component 102 on the side of roof module 101 facing toward the vehicle front. A sealing element 107 having an H-shaped cross section serves to fix cover element 105.

The H-shaped cross section of sealing element 107 ensures a compensation gap between cover element 105 and panel component 102 for compensating for temperature-related changes in the length of panel component 102. A protective membrane 108 is installed between cover element 105 and environment sensor 106. Protective membrane 108 encloses a sealed transmission volume 109, which neither ambient light nor dirt can enter.

A sensor mount 110, which is fixed to inner side 111 of panel component 102, serves to attach environment sensor 106 to panel component 102. To this end, sensor mount 110 can be welded or glued on.

Figure 14:
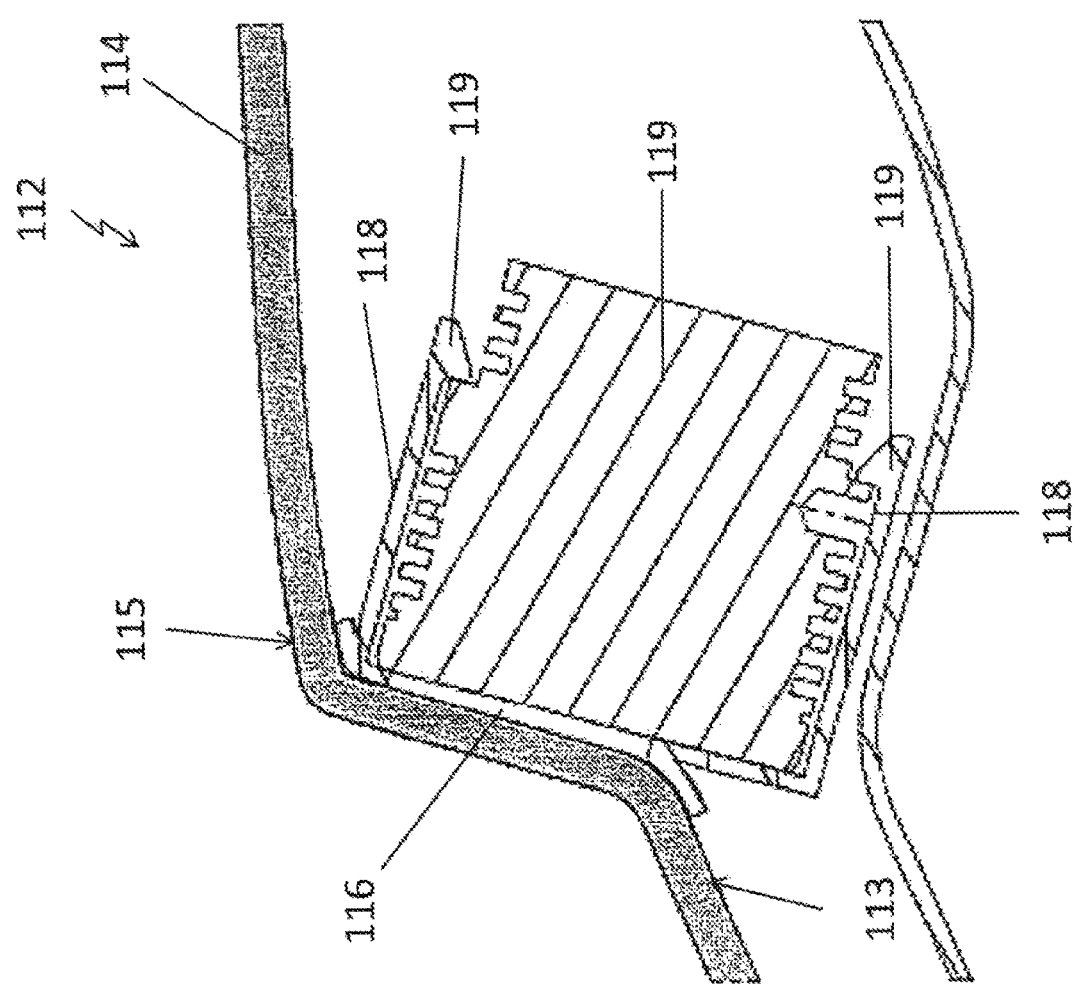
FIG. 14 is a schematic cross section of another embodiment of a roof module.

FIG. 14 shows a cross section of another embodiment 112 of a roof module. A sensor mount 116 is glued to inner side 113 of a panel component 114, which forms roof skin 115 of the vehicle. The U-shaped cross section of sensor mount 116 surrounds an environment sensor 117 on three sides. Latching hooks 119, which can latch onto environment sensor 117 in a fixing manner, are provided on each of the free legs 118 of sensor mount 116. The outer side of sensor mount 116 is glued to inner side 113 of panel component 114.

Figure 15:
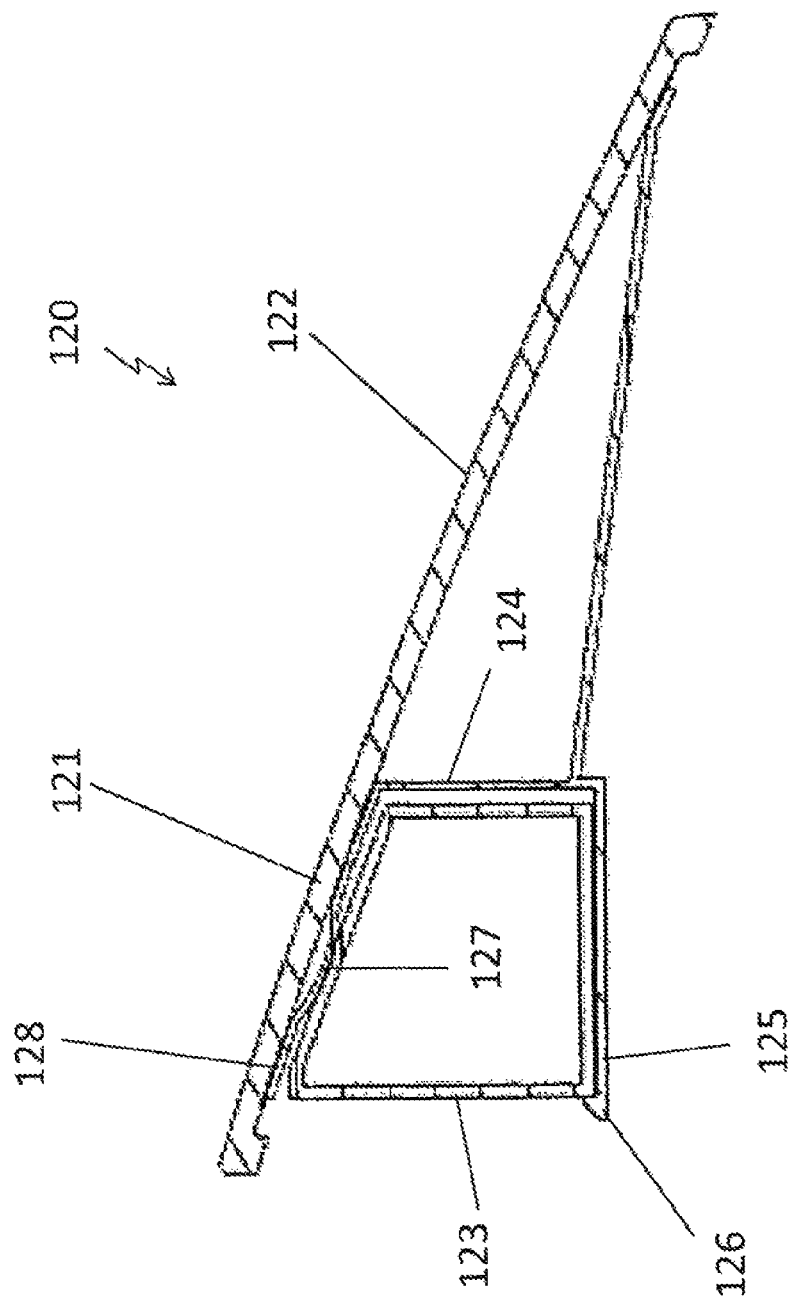
FIG. 15 is a schematic cross section of another embodiment of a roof module.

FIG. 15 shows a schematic cross section of another embodiment 120 of a roof module. An environment sensor 123 is fixed in a sensor mount 124 below a panel component 121, which forms roof skin 122 of the vehicle. Sensor mount 124 is glued or welded to the inner side of panel component 121. Lower free leg 124 of U-shaped sensor mount 124 has a latching hook 126 for fixing environment sensor 123 in sensor mount 124. A bulge 127, which can come to rest in a corresponding depression in environment sensor 123 in a form-fitting manner, is provided on upper leg 128 of sensor mount 124.

The invention claimed is:

1. A roof module for forming a vehicle roof on a motor vehicle, the roof module comprising:
    a panel component whose outer surface at least partially forms the roof skin of the vehicle roof,
    the roof module comprising at least one environment sensor, and
    the environment sensor configured to send and/or receive electromagnetic signals for detecting the vehicle environment,
    wherein the panel component has at least one cutout through which the electromagnetic signals of the environment sensor can pass,
    wherein the panel component is composed of multiple segments between which expansion joint elements are provided.

2. The roof module according to claim 1, wherein in a cover element through which the electromagnetic signals of the environment sensor can pass is disposed in the cutout of the panel component.

3. The roof module according to claim 1, wherein the environment sensor is fixed in the roof module in a manner mechanically decoupled from the panel component.

4. The roof module according to claim 3, wherein the roof module comprises a stiff roof frame to which the environment sensor is attached.

5. The roof module according to claim 1, wherein a cover element is integrated in the environment sensor.

6. The roof module according to claim 1 wherein a cover element is made of polycarbonate (PC) or polymetamethylacrylate (PMMA) or mineral glass.

7. The roof module according to claim 1, wherein the environment sensor is at least one of a lidar sensor, a radar sensor, a camera sensor, and a multi-camera sensor.

8. A motor vehicle comprising a roof module according to claim 1.

* * * * *